T. M. MUELLER.
ARMATURE WINDING.
APPLICATION FILED SEPT. 8, 1913.
1,207,197.
Patented Dec. 5, 1916.
2 SHEETS—SHEET 1.
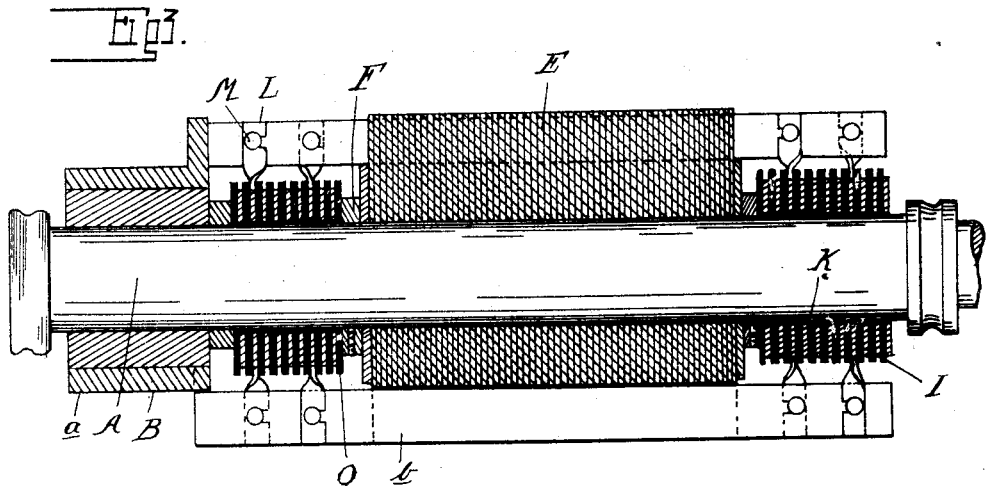
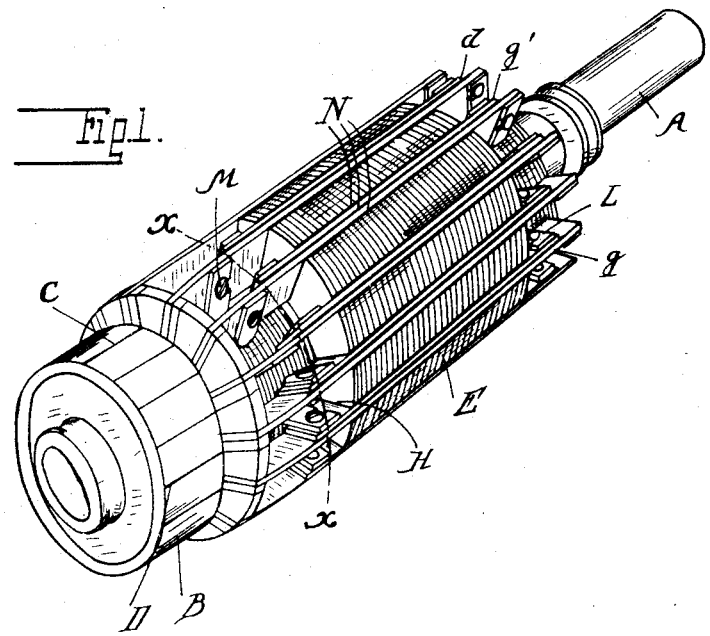
Witnesses
W. K. Ford
James O. Barry
Inventor
Theodor M. Mueller
By
Att'ys T. M. MUELLER.
ARMATURE WINDING.
APPLICATION FILED SEPT. 8, 1913.
1,207,197.
Patented Dec. 5, 1916.
2 SHEETS—SHEET 2.
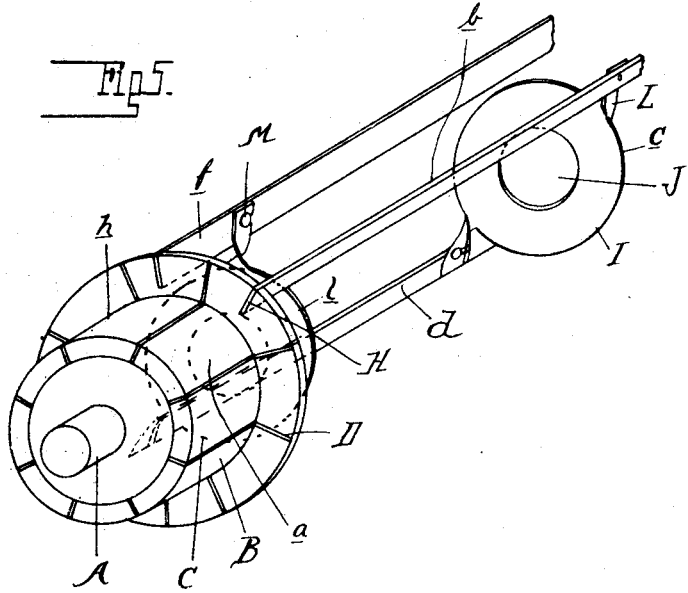
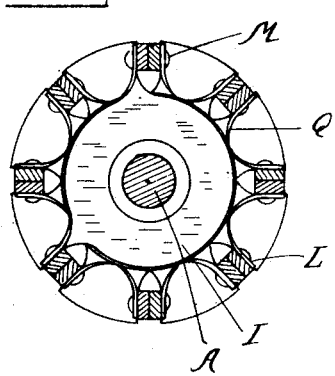
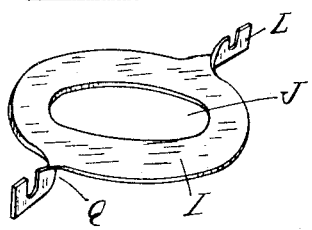
Witnesses
H. K. Ford
James P. Barry
Inventor
Theodor M. Mueller
By (signature)
Atty's

UNITED STATES PATENT OFFICE.

THEODOR M. MUELLER, OF DETROIT, MICHIGAN, ASSIGNOR TO MAXIMUM ELECTRICAL COMPANY, OF DETROIT, MICHIGAN, A CORPORATION OF MICHIGAN.

ARMATURE-WINDING.

1,207,197.  Specification of Letters Patent.  Patented Dec. 5, 1916.

Application filed September 8, 1913. Serial No. 788,776.

*To all whom it may concern:*

Be it known that I, THEODOR M. MUELLER, a subject of the Emperor of Germany, residing at Detroit, in the county of Wayne and State of Michigan, have invented certain new and useful Improvements in Armature-Windings, of which the following is a specification, reference being had therein to the accompanying drawings.

My invention relates to armatures for dynamos, motors or the like, and has among the objects thereof to provide a simple and efficient device which may be readily assembled; to provide an improved form of winding for the armature; and further, to provide a comparatively light and condensed structure.

Other objects of the invention will more fully hereinafter appear.

The invention resides in the peculiar construction, arrangement and combination of parts as hereinafter set forth and pointed out in the claims.

In the drawings, Figure 1 is a perspective view of an armature embodying the invention; Fig. 2 is a section on the line $x$—$x$ of Fig. 1; Fig. 3 is a longitudinal section; and Fig. 4 is a perspective view of one of the disks forming the end connections of the winding. Fig. 5 is a perspective view of the commutator together with several of the armature conductors forming a circuit.

A designates the shaft of the armature and B the commutator ring, which is formed of a plurality of segments C separated by insulating strips D.

E is a core of suitable laminations mounted upon the shaft A, the laminations being clamped together by means of rings F at opposite ends of the core. The windings are of my improved construction, and in the structure illustrated in the drawing, which is the preferred form, comprises a series of conductor bars arranged in recesses H in the core, and a plurality of connectors I for the ends of the bars. The latter are positioned at opposite ends of the core and are formed of flat disks centrally apertured at J so as to engage insulating sleeves K arranged upon the shaft adjacent the core. The connection between the disks and the bars is effected by means of ears or lugs L formed integral with the disks and attached to the bars preferably by means of rivets M.

As shown, there are a series of bars $g$ which are connected at one end to the segments C of the commutator ring, and a second series of shorter bars $g'$ which are not secured to the segments C. In order to condense the structure the bars are arranged in pairs in the slots H, each pair preferably comprising a short and a long bar. The members of these pairs are separated by suitable insulating strips N, both from each other and the laminations. The disks I when assembled upon the shaft are insulated from each other by means of plates or thin disks O, and each of the members I is provided with two lugs L, these ears being respectively secured to a short bar at one side of the core, and a long bar adjacent the opposite side. Thus, tracing the current from the segment $a$ of the commutator ring, the current passes along the bar designated by $b$, thence to the disk $c$ at one end of the core, around said disk to a short bar $d$ adjacent the side of the core opposite from the bar $b$, then to the disk $l$ at the commutator end of the core and from the latter disk to a longer bar $f$ which connects to the segment $h$ adjacent the segment $a$. Similarly the adjacent segments throughout the commutator ring are each connected by a similar series of bars and disks.

As will be apparent from the foregoing description, each individual section or winding of the armature winding is formed of a long and a short bar that are connected at each end to the core by a disk I.

It is further desirable to have a large surface contact between the ears or lugs L and the bars and therefore, I form the ears comparatively wide and bend or turn them at approximately right angles to the plane of the disk I, so that the wide flat faces P of the ears engage the flat side of the bars. As the distance between the bars of adjacent pairs is comparatively short, in order that the bends Q of the ears may not interfere with proper spacing of the members L for engagement with the bars, adjacent lugs for the bars $g$ are turned in the same direction, thereby permitting the bends to slightly overlap—as shown in Fig. 2—while the ears adjacent the opposite sides of the disks for engaging the bars $g'$ are turned in a direction opposite to the ears for attachment to the bars $g$. By this arrangement the disks may lie in immediate proximity to each other, being separated only by the insulation, thereby reducing the space occupied by the connector for the bars to a minimum, while at the same time permitting the conducting surface of the disks I to be of the desired area. While the spacing of the lugs or ears L circumferentially upon the disks varies for the individual windings, for any given winding, the disks at the front of the core are similar and interchangeable and the same is also true of those at the back.

In assembling the structure after the core is mounted upon the shaft A, the bars with the rivets M attached thereto are suitably insulated and arranged in the recesses H, and then adjusted to their proper positions longitudinally in relation to the core. The connector disks I for one end of the armature are then mounted upon the insulator sleeve K with the plates N interposed therebetween, and the sleeve is then engaged with the shaft A. The lugs are slotted at R so as to be readily engaged with the rivets, the slots opening toward the core, and after the engagement between the ears and rivets, the latter are suitably clamped to fixedly attach the ears to the bars. The connectors at the opposite end of the core are similarly positioned upon the shaft and connected to the conductor bars. When the connector disks are attached to the bars they not only hold the bars against any radial movement, due to centrifugal action, but also the end members of the series of disks I serve to hold the remaining conductor disks against longitudinal movement in relation to the shaft A. After the disks and bars are properly assembled the commutator ring is mounted upon the shaft and the ends of the bars g suitably secured within slots S in the segments C.

A construction of winding embodying my invention may be very cheaply manufactured, since the bars and disks can be formed of stampings, while it takes but very little time to assemble the parts of the winding, thereby materially reducing the cost of manufacture over an armature in which the winding is formed of wire, since it requires both skill and a considerable length of time to properly wind an armature with wire. Furthermore, in a two-pole armature having wire windings, the length of the individual windings or coils varies. Therefore, the resistance of the several coils is not the same. With my improved structure, however, the length of all the individual coils are substantially equal, thereby producing a uniformly balanced armature.

While I have shown the invention as embodied in a two-pole armature, the invention is equally applicable to an armature having any number of poles, and also while I have illustrated and described the preferred form of my invention, I do not desire to limit my protection to the specific structure shown.

What I claim as my invention is:

1. A rotor, comprising a commutator, a slotted core, and a winding comprising a pair of bars side by side in each slot and a plurality of disks forming end connections between the bars at each side of the core, the disks being formed with lugs twisted to engage with the bars, each pair of bars including a long and a short bar, and each long bar having direct connection with the commutator.

2. A rotor, comprising a commutator, a slotted core, and a winding comprising bars mounted in the slots of said core, and disks forming end connections between the bars at each side of the core, the disks being formed with outwardly-projecting lugs twisted into planes transverse to the disks, said lugs having slots opening toward the core, and headed members passing through the slots of the lugs securing the same to the bars.

In testimony whereof I affix my signature in presence of two witnesses.

THEODOR M. MUELLER.

Witnesses:
Wm. J. Belknap,
James P. Barry.

Copies of this patent may be obtained for five cents each, by addressing the "Commissioner of Patents, Washington, D. C."